United States Patent
Böckler et al.

(10) Patent No.: US 12,091,737 B2
(45) Date of Patent: *Sep. 17, 2024

(54) METHOD FOR IMPROVED CURRENT CONTACTING WHEN WELDING USING A CURRENT-CARRYING WIRE ELECTRODE

(71) Applicant: Messer SE & Co. KGaA, Bad Soden (DE)

(72) Inventors: Thomas Böckler, Dusseldorf (DE); Bernd Hildebrandt, Tönisvorst (DE); Georg Selders, Weeze-Wemb (DE); Mario Rockser, Hinrichshagen (DE); Dirk Kampffmeyer, Linnich (DE)

(73) Assignee: Messer SE & Co. KGaA, Bad Soden (DE)

( * ) Notice: Subject to any disclaimer, the term of this patent is extended or adjusted under 35 U.S.C. 154(b) by 651 days.

This patent is subject to a terminal disclaimer.

(21) Appl. No.: 17/280,477

(22) PCT Filed: Oct. 1, 2019

(86) PCT No.: PCT/EP2019/076620
§ 371 (c)(1),
(2) Date: Mar. 26, 2021

(87) PCT Pub. No.: WO2020/070143
PCT Pub. Date: Apr. 9, 2020

(65) Prior Publication Data
US 2022/0033948 A1    Feb. 3, 2022

(30) Foreign Application Priority Data
Oct. 2, 2018   (DE) .................. 102018007760.9

(51) Int. Cl.
*C22F 1/08*     (2006.01)
*B23K 9/12*     (2006.01)
*C22F 1/00*     (2006.01)

(52) U.S. Cl.
CPC ............. *C22F 1/08* (2013.01); *B23K 9/123* (2013.01); *C22F 1/002* (2013.01)

(58) Field of Classification Search
CPC ............ B23K 9/123; C21D 6/04; C22F 1/002
See application file for complete search history.

(56) References Cited

U.S. PATENT DOCUMENTS 3,819,428 A    6/1974  Moore
5,442,929 A *  8/1995  Gillin .................... H01H 11/04
                                              29/877

(Continued)

FOREIGN PATENT DOCUMENTS

CN    103463739 A    12/2013
CN    104087729 A    10/2014

(Continued)

OTHER PUBLICATIONS

Ciski, A., et al. "Multistage cryogenic treatment of x153crmov12 cold work steel." IOP Conference Series: Materials Science and Engineering, vol. 461, 2018, p. 012012 (Year: 2018).*

(Continued)

*Primary Examiner* — Keith Walker
*Assistant Examiner* — Ryan L Heckman
(74) *Attorney, Agent, or Firm* — Andrus Intellectual Property Law, LLP

(57) ABSTRACT

When welding with a consumable wire electrode, current contacting occurs when the electrode wire passes by a readily electrically conductive contact element. In order to improve the current contacting and reduce the wear of the contact element in particular, the invention proposes subjecting contact elements to a cold treatment prior to using same. The cold treatment has a cooling phase during which the temperature of the contact element is reduced to a lower target temperature, a subsequent holding phase in which the (Continued)

contact element is substantially held at the target temperature, and a final heating phase, in which the contact element is brought to an upper target temperature. The use of contact elements treated using the method according to the invention leads to a substantial increase of the wear resistance compared to untreated contact elements.

20 Claims, 1 Drawing Sheet

(56) References Cited

U.S. PATENT DOCUMENTS

| | | | | |
|---|---|---|---|---|
| 6,332,325 | B1* | 12/2001 | Monfort | C21D 6/04 62/62 |
| 6,537,396 | B1 | 3/2003 | Ijames | |
| 7,297,418 | B2* | 11/2007 | Watson | C04B 41/0072 428/457 |
| 2004/0182202 | A1 | 9/2004 | Geving et al. | |
| 2009/0260298 | A1* | 10/2009 | Benoit | B24D 18/00 51/298 |
| 2021/0387260 | A1 | 12/2021 | Bockler et al. | |
| 2023/0211419 | A1 | 7/2023 | Hildebrandt et al. | |
| 2023/0241686 | A1 | 8/2023 | Kampffmeyer et al. | |

FOREIGN PATENT DOCUMENTS

| | | |
|---|---|---|
| CN | 104129083 A | 11/2014 |
| CN | 105586477 A | 5/2016 |
| CN | 108588582 A | 9/2018 |
| DE | 2517147 A1 | 10/1976 |
| DE | 19904348 A1 | 8/2000 |
| EP | 0195759 A2 | 9/1986 |
| EP | 1242929 A2 | 9/2002 |
| EP | 1842929 A1 | 10/2007 |
| WO | WO 2011099711 A2 | 8/2011 |
| WO | WO 2015155745 A1 | 10/2015 |

OTHER PUBLICATIONS

W. Lausecker, "Wie cool ist das—Die Tieftemperaturbehandlung von Zerspanung-Werkzeugen" [How cool is that—the low-temperature treatment of machining tools], Werkzeug-Technik 126, Jun. 15, 2012, pp. 96-97.

W. Mohler et al: "Stromkontaktrohre Mit verbesserten Eigenschaften—hergestellt aus stranggepressten Werkstoffverbunden," Doctoral thesis presented at the Chemistry Department of the Universite de Lausanne, Dusseldorf, Germany, vol. 53, No. 9, Sep. 1, 2001, pp. 616-619.

International Search Report and Written Opinion issued in corresponding PCT Application No. PCT/EP2019/076620, mailed Jan. 16, 2020.

C.A. Jagadish et al., "Effect of Cryogenic Treatment of the Mechanical Properties of 18Ni-300 Grade Maraging Steel Built Using the Direct Metal Laser Sintering (DMLS) Technology", Key Engineering Materials, Nov. 17, 2016, pp. 114-121, vol. 719.

A. Ciski et al., "Multistage cryogenic treatment of X153CrMoV12 cold work steel", IOP Conference Series: Materials Science and Engineering, Dec. 10, 2018, p. 012012, vol. 461.

* cited by examiner

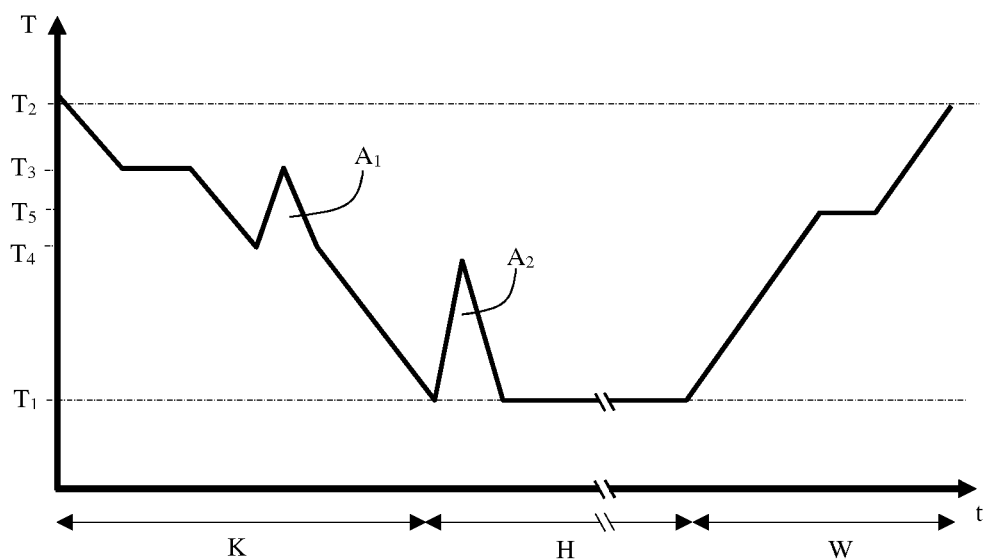

METHOD FOR IMPROVED CURRENT CONTACTING WHEN WELDING USING A CURRENT-CARRYING WIRE ELECTRODE

CROSS-REFERENCE TO RELATED APPLICATIONS

This application is the U.S. national stage application of International Application No. PCT/EP2019/076620, filed Oct. 1, 2019, which International Application was published on Apr. 9, 2020, as International Publication WO 2020/070143 in the German language. The International Application claims priority to German Application No. 10 2018 007 760.9, filed Oct. 2, 2018. The International Application and German Application are hereby incorporated herein by reference, in their entireties.

FIELD

The invention relates to a method for improving current contacting when arc welding using a current-carrying wire electrode by means of an apparatus for arc welding in which, to pick up current, the wire electrode is passed through a contact element connected to a power source.

BACKGROUND

Welding methods using a current-carrying wire electrode include most classic arc welding methods, such as gas metal arc welding or submerged arc welding. In addition, current-carrying wire electrodes are also used in laser hybrid welding. The wire electrodes used in these cases consist of a material that is adapted to the material of the base metals to be welded. They may be formed as solid wires or else flux-cored wires. In the latter case, the wire electrode consists of a tube that is filled with a metal powder. During the production of the wires, various drawing processes and heat treatments are used, influencing the quality of the wire filler.

In the case of all of the methods mentioned, the electrical connection of the wire electrode takes place by way of a contact element fitted in the welding torch. The contact element is usually produced from copper or a copper alloy (E-Cu or CuCrZr) and is electrically connected to a power source during use. The contact element is usually releasably connected to the welding torch and is for example screwed in the head of the torch. Contact elements are adapted to the type and cross section of the electrode respectively used; wire electrodes with diameters of up to 2.5 mm are generally contacted by means of contact tips. For wire electrodes with a greater diameter or for strip electrodes, split contact tubes or plates are used. Contact tips, tubes and plates are from now on subsumed under the term "contact element".

The contact element is exposed to great wear during use and must therefore be exchanged from time to time—depending on the respective loading. The wear is caused on the one hand by the loading attributable to the current, and on the other hand abrasively by the friction of the wire electrode pushing along the inner surface of the contact element.

In order to counteract the susceptibility to wear of contact elements, it is proposed for example in DE 199 04 348 A1 and EP 19 575 981 A1 to apply to the surface of the contact element a coating that is intended to reduce the mechanical wear caused by the wire electrode pushing forward. This however leads to considerable extra costs in the production of the contact element.

SUMMARY

The invention is based on the object of reducing the wear of the contact element and thereby increasing its service life.

This object is achieved by a method with the features of patent claim 1 and by an electrical contact element with the features of patent claim 10. Advantageous refinements can be taken from the subclaims.

According to the invention, after their production and before their intended use for current contacting of a consumable wire electrode in a welding apparatus, the contact elements are subjected to a cold treatment, during which they are cooled down to a lower target temperature of below minus 50° C., preferably below minus 100° C. It has surprisingly been found that contact elements that have been treated by the method according to the invention have much lower abrasive wear compared to the use of untreated contact elements. The method according to the invention is suitable for the treatment of all commonly used contact elements that are intended for establishing current contact with a consumable wire electrode. In particular, the method according to the invention is suitable for the treatment of current contact tips, tubes or plates for gas metal arc welding or submerged arc welding torches or for laser hybrid welding heads. These are preferably contact elements of copper or a copper alloy, such as for example E-Cu or CuCrZr, with or without coating.

Within the scope of this invention, the term "cold treatment" is intended to refer to a method in which a workpiece is exposed to temperatures of −50° C. and below. The cooling in this case generally takes place by direct or indirect contact with a cryogenic medium, for example cold gaseous or liquefied nitrogen. The cold treatment preferably takes place in a closed container (cold chamber), in which a correspondingly low treatment temperature is set by direct or indirect thermal contact of the contact element with a refrigerant. A correspondingly temperature-adjusted atmosphere is preferably produced in the cold chamber in which the workpiece to be treated is present, whereby a temperature adjustment of the workpiece that is uniform from all sides is achieved and moreover the temperature of the atmosphere present in the cold chamber can be exactly set. For example, the production of the temperature-adjusted atmosphere in the cold chamber takes place by introducing a correspondingly temperature-adjusted gas, for example nitrogen.

Cold treatments of metallic workpieces are known for example from U.S. Pat. No. 6,537,396 B1, U.S. Pat. No. 3,819,428 B1, EP 124 29 29 A1 and the article by W. Lausecker, "Wie cool ist das—Die Tieftemperaturbehandlung von Zerspanung-Werkzeugen" [How cool is that—the low-temperature treatment of machining tools], Werkzeug-Technik 126, Jun. 15, 2012, and relate in particular to the transformation hardening of steel. This involves increasing the hardness of a workpiece produced from steel by cooling the workpiece down to a temperature between minus 70° C. and minus 180° C. following its production and a subsequent heat treatment and keeping it at this temperature for a time period of for example 15 h.

A method for the cold treatment of electrical switching contacts is also known from U.S. Pat. No. 5,442,929 A. In order to produce an electrical contact with the lowest possible resistance, the contact surfaces corresponding to one another of an electrical switching arrangement often consist of a composite material containing copper and silver. On account of the high electrical current densities in the arcs occurring during the switching operation between the contacts moved toward one another and also due to the mechanical loading of the always identical contact surfaces meeting one another every time the switch is actuated, they are subjected to a high level of wear. It has been found that a treatment in which the contact surfaces are cooled down to a temperature of below 172 K and are kept at this temperature at least for three hours can extend the service life of such switching contact surfaces. On account of the different loading stresses, this teaching is not however readily transferable to contact elements for consumable wire electrodes, since they do not undergo a switching operation but instead form a permanent current contact, but are subjected to constant abrasive wear because of the feeding of the wire.

The lower target temperature, that is to say the lowest cooling-down temperature, is preferably between minus 50° C. and minus 195° C., particularly preferably between minus 100° C. and minus 185° C., values below minus 150° C. showing particularly good results.

The upper target temperature, completing the method, is a temperature value that is suitable for preventing the condensation of water from an ambient atmosphere present in particular under standard conditions (20° C.), in order to avoid corrosion on the surface of the wire. Until the upper target temperature is reached, the method according to the invention is therefore preferably carried out in an inert atmosphere with a low water content, for example in an atmosphere that consists predominantly of gaseous nitrogen and/or a noble gas. For example, the upper target temperature is between 20° C. and 40° C.

A particularly advantageous refinement of the invention provides that, following the cooling phase and before the heating phase, the contact element passes through a holding phase, in which the contact element is kept at the lower target temperature for a duration of at least 30 s. A significant improvement in the wear resistance of the contact element is already obtained with holding times of between 30 s and 10 min. According to the invention, a holding time that exceeds 90 min is not required, even though it is not ruled out. The duration of the holding phase is preferably between 10 min and 60 min.

The cooling and heating of the contact element in the cold treatment preferably takes place slowly, in order to ensure that there is no temperature shock and complete and uniform cooling through of the workpiece is achieved. Accordingly, it proves to be advantageous if the cooling of the contact element in the cooling phase and/or the heating of the contact element in the heating phase do not take place more quickly than with a change in temperature (rate) $\Delta T/\Delta t$ of $\Delta T/\Delta t \leq 10$ K/min; preferably, $\Delta T/\Delta t$ is between 1 K/min and 10 K/min, particularly preferably between 1.5 K/min and 5 K/min (not counting interruption times respectively included in the cooling and heating operations).

In order to ensure uniform cooling or heating, it is additionally advantageous to interrupt the cooling operation in the cooling phase and/or the heating operation of the heating phase the cooling and heating of the contact element a number of times and to keep the contact element at a prescribed intermediate temperature for a prescribed time period (intermediate holding phase). For example, an interruption during which the workpiece is kept substantially at the temperature reached may be respectively inserted at intervals of 5 K to 50 K. Following the intermediate holding phase, the cooling operation or the heating operation is continued as before. During the interruptions, rearrangement processes may still take place in the crystal structure of the workpiece material with a comparatively high diffusion rate, having a potentially positive effect on the homogeneity of the workpiece and consequently the enhancement of positive material properties. According to the invention, the duration of an intermediate holding phase in the cooling phase and/or the heating phase is preferably in each case at least 30 s, preferably in each case between 1 min and 120 min.

A particularly advantageous refinement of the invention envisages heating the contact element and subsequently cooling it down again to the lower target temperature or some other temperature one or more times during the cooling phase and/or holding phase and/or an intermediate holding phase. Such an interim heating phase may take place instead of or in addition to an intermediate holding phase. The interim heating phases have the effect of reducing stresses in the material treated, which may occur in the material as a result of the temperature changes in the course of the cold treatment. Together with a cooling rate adapted to the respective workpiece, interim heating phases thus prevent a reduction in the quality of the current contact. For example, heating takes place one or more times in the cooling phase and/or the holding phase, while the initial temperature (that is to say the temperature before the beginning of the cold treatment) is not exceeded. Depending on the starting temperature, heating respectively takes place by at least 10 K, preferably at least 50 K, for example to a temperature value of in each case between −140° C. and −160° C. Following this interim heating phase, renewed cooling takes place, followed by a further interim heating phase and/or cooling to the lower target temperature, for example of between minus 150° C. and minus 195° C.

The temperature adjustment, i.e. the cooling or heating, of the contact element during the cold treatment expediently takes place by producing a correspondingly temperature-adjusted atmosphere in a cold chamber containing the contact element. For producing the temperature-adjusted atmosphere in the cold chamber, for example an inert gas, for example nitrogen or a noble gas, is brought to a corresponding temperature outside the cold chamber and is subsequently supplied to the cold chamber.

The object of the invention is also achieved by electrical contact elements that have been treated by the method according to the invention. The contact elements according to the invention are suitable for fitting in all welding apparatuses equipped with current-carrying, consumable wire electrodes. In particular in the case of contact elements produced from copper or a copper alloy, the contact elements according to the invention show considerably lower susceptibility to wear and lower electrical resistance during use than untreated contact elements. A special coating is not required for this.

BRIEF DESCRIPTION OF THE DRAWING

An exemplary embodiment of the invention is to be explained in more detail on the basis of the drawing. The drawing schematically shows in a temperature (T)-time (t) diagram the variation of the temperature of a contact element during the treatment by a method according to the invention.

DETAILED DESCRIPTION

A contact element of copper or a copper alloy that is at ambient temperature and for fitting in a welding torch, for example a welding torch for submerged arc or gas metal arc welding, is fed to a cold chamber and the latter is subsequently closed. By successively supplying a refrigerant, for example cold gaseous nitrogen at a temperature of minus 190° C., the temperature of the atmosphere inside the cold chamber is slowly lowered, for example at a rate ΔT/Δt of between 1 K/min and 10 K/min. As a result, the temperature of the contact element falls during a cooling phase K to a lower target temperature $T_1$ of for example minus 150° C. Following the cooling phase K, the contact element is kept at the lower target temperature $T_1$ for a time period of for example 1 min to 100 min (holding phase H). Following the holding phase H, the contact element is heated gradually, i.e. at a heating rate that is comparable to the cooling rate in the cooling phase K, to an upper target temperature $T_2$ (heating phase W) by supplying a gas (for example nitrogen), the temperature of which is higher than the temperature inside the cold chamber. $T_2$ corresponds for example to the ambient temperature.

In order to reduce stresses in the treated material occurring on account of the cold treatment, it is advantageous to increase the temperature of the workpiece in the cold chamber temporarily during the cooling phase K and/or the holding phase H. In these interim heating phases $A_1$, $A_2$, a temperature increase, by for example 10 K to 50 K, takes place to a value below the initial temperature. In the exemplary embodiment shown here, a first interim heating phase $A_1$ takes place once the temperature of the wire electrode has reached a value of $T_4$, and a second heating phase $A_2$ takes place once the lower target temperature $T_1$ has been reached. The heating phase $A_2$ may be followed by a further interim heating phase, or the workpiece remains at the lower target temperature $T_1$ for a certain time period.

During the cooling phase K, the supply of the refrigerant may be stopped one or more times and as a result the cooling of the contact element slowed or kept at a prescribed temperature. Similarly, in the heating phase W, the supply of warm gas may be interrupted one or more times, and so the heating rate slowed or the contact element kept at a prescribed temperature. In these intermediate holding phases, therefore, $\Delta T/\Delta t \ll 1$ K/min. In the exemplary embodiment shown in the drawing, intermediate holding phases are inserted during the cooling phase K at a temperatures $T_3$, with $T_1 < T_4 < T_3 < T_2$, and during the heating phase W at a temperature $T_5$, with $T_1 < T_5 < T_2$. After the cold treatment, the contact element is removed from the cold chamber and fitted into a welding apparatus.

The invention claimed is:

1. A method for improving current contacting when arc welding using a current-carrying wire electrode by means of an apparatus for arc welding in which, to pick up current, the wire electrode is passed through a contact element connected to a power source, in which method, before its intended use, the contact element is subjected to a cold treatment, in which the contact element is cooled down to a lower target temperature of below minus 50° C. in a cooling phase, held at the lower target temperature during a holding phase, and subsequently heated up to an upper target temperature in a heating phase;
   wherein the cooling phase or the holding phase is interrupted by a first interim heating phase in which the contact element is warmed to a first interim temperature and subsequently cooled; and
   wherein the cooling phase or the holding phase is interrupted by a second interim heating phase in which the contact element is warmed to a second interim temperature and subsequently cooled, wherein the second interim temperature is different than the first interim temperature.

2. The method as claimed in claim 1, wherein the lower target temperature is between minus 50° C. and minus 195° C.

3. The method as claimed in claim 1, wherein the upper target temperature is between 20° C. and 40° C.

4. The method as claimed in claim 1, wherein, during the holding phase, the contact element is kept at the lower target temperature for a duration of at least 30 seconds.

5. The method as claimed in claim 1, wherein the cooling of the contact element in the cooling phase and/or the heating of the contact element in the heating phase take place at a rate of between 1.5 K/minute and 10 K/minute.

6. The method as claimed in claim 1, wherein the cooling phase and/or the heating phase is interrupted by an intermediate holding phase during which the contact element is kept substantially at a temperature reached for a prescribed time period.

7. The method as claimed in claim 1, wherein, prior to the first interim heating phase, the contact element is cooled to a temperature below the first interim temperature, and wherein, prior to the second interim heating phase, the contact element is cooled to a temperature below the second interim temperature; and
   wherein the first interim temperature to which the contact element is heated during the first interim heating phase and/or the second interim temperature to which the contact element is heated during the second interim heating phase is between minus 140° C. and minus 186° C.

8. The method as claimed in claim 1, wherein the temperature adjustment of the contact element during the cold treatment takes place by producing a correspondingly temperature-adjusted atmosphere in a cold chamber containing the contact element.

9. An electrical contact element for the current contacting of wire electrodes, wherein the electrical contact element has been subjected to a method for cold treatment as claimed in claim 1.

10. The method as claimed in claim 1, wherein the cooling phase is interrupted by the first interim heating phase and the holding phase is interrupted by the second interim heating phase.

11. The method as claimed in claim 1, wherein the contact element is warmed by at least 10° C. during the first interim heating phase and/or the second interim heating phase.

12. The method as claimed in claim 11, wherein the contact element is warmed by at least 50° C. during the first interim heating phase and/or the second interim heating phase.

13. The method as claimed in claim 1, wherein a heating rate of the contact element and a cooling rate of the contact element during the first interim heating phase is different than a heating rate of the contact element and a cooling rate of the contact element during the second interim heating phase.

14. The method as claimed in claim 1, wherein a cooling rate of the contact element during the cooling phase is different than a heating rate of the contact element and a cooling rate of the contact element during the first interim heating phase.

15. The method as claimed in claim 14, wherein the cooling rate of the contact element during the cooling phase is lower than the heating rate of the contact element and the cooling rate of the contact element during the first interim heating phase.

16. The method as claimed in claim 14, wherein the heating rate of the contact element during the first interim heating phase and the cooling rate of the contact element during the first interim heating phase are equal.

17. The method as claimed in claim 6, wherein the contact element is kept at the temperature reached for a duration of at least 30 seconds during the intermediate holding phase.

18. The method as claimed in claim 17, wherein the contact element is kept at the temperature reached for a duration between one minute and 120 minutes during the intermediate holding phase.

19. The method as claimed in claim 6, wherein the intermediate holding phase is a first intermediate holding phase and the cooling phase is interrupted by the first intermediate holding phase, and wherein the heating phase is interrupted by a second intermediate holding phase.

20. The method as claimed in claim 2, wherein the lower target temperature is between minus 100° C. and minus 185° C.

\* \* \* \* \*